US012781821B2

(12) United States Patent
Rousseau et al.

(10) Patent No.: US 12,781,821 B2
(45) Date of Patent: Nov. 3, 2026

(54) METHOD FOR PROTECTION AGAINST OXIDATION OF A COMPOSITE MATERIAL PART COMPRISING CARBON

(71) Applicants: SAFRAN LANDING SYSTEMS, Velizy-Villacoublay (FR); CENTRE NATIONAL DE LA RECHERCHE SCIENTIFIQUE, Paris (FR); CENTRALE LILLE INSTITUT, Villeneuve d'Ascq (FR); ECOLE NATIONALE SUPERIEURE DE CHIMIE DE LILLE, Villeneuve d'Ascq (FR); UNIVERSITE DE LILLE, Lille (FR)

(72) Inventors: Guillaume Rousseau, Balma (FR); Fanny Alousque, Moissy-Cramayel (FR); François Mear, Villeneuve d'Ascq Cedex (FR); Lionel Montagne, Villeneuve d'Ascq Cedex (FR)

(73) Assignees: SAFRAN LANDING SYSTEMS, Velizy-Villacoublay (FR); CENTRE NATIONAL DE LA RECHERCHE SCIENTIFIQUE, Paris (FR); CENTRALE LILLE INSTITUT, Villeneuve d'Ascq (FR); UNIVERSITE DE LILLE, Lille (FR)

( * ) Notice: Subject to any disclaimer, the term of this patent is extended or adjusted under 35 U.S.C. 154(b) by 0 days.

(21) Appl. No.: 18/996,599

(22) PCT Filed: Jul. 25, 2023

(86) PCT No.: PCT/FR2023/051155
§ 371 (c)(1),
(2) Date: Jan. 17, 2025

(87) PCT Pub. No.: WO2024/023435
PCT Pub. Date: Feb. 1, 2024

(65) Prior Publication Data

US 2025/0257774 A1 Aug. 14, 2025

(30) Foreign Application Priority Data

Jul. 26, 2022 (FR) ...................................... 2207653

(51) Int. Cl.
*F16D 69/02* (2006.01)
*C03B 32/00* (2006.01)
*C03C 3/078* (2006.01)
*C03C 3/097* (2006.01)

(52) U.S. Cl.
CPC ............ *F16D 69/027* (2013.01); *C03B 32/00* (2013.01); *C03C 3/078* (2013.01); *C03C 3/097* (2013.01); *F16D 2200/0052* (2013.01)

(58) Field of Classification Search
CPC ...................................................... C03C 3/078
See application file for complete search history.

(56) References Cited

U.S. PATENT DOCUMENTS

| | | | | |
|---|---|---|---|---|
| 5,686,144 A * | 11/1997 | Thebault | F16D 69/023 | 427/430.1 |
| 5,849,649 A * | 12/1998 | Poole | C03C 8/04 | 501/24 |
| 2004/0182285 A1* | 9/2004 | Mazany | C04B 28/008 | 501/47 |

FOREIGN PATENT DOCUMENTS

FR 3 095 436 A1 10/2020

OTHER PUBLICATIONS

International Search Report as issued in International Patent Application No. PCT/FR2023/051155, dated Nov. 2, 2023.
Written Opinion of the International Searching Authority as issued in International Patent Application No. PCT/FR2023/051155, dated Nov. 2, 2023.

* cited by examiner

*Primary Examiner* — Austin Murata
(74) *Attorney, Agent, or Firm* — CUSHMAN PARTNERS LLC

(57) ABSTRACT

A method for protection against oxidation of a composite material part includes carbon, the method including impregnating an internal porosity of the part with an impregnation composition including, as percentages by weight: (i) between 1% and 60% of colloidal silica; (ii) between 0.5% and 20% of a flux precursor including at least one nitrate of an alkali metal M1; (iii) between 0.5% and 20% of a lattice modifying precursor, including at least one nitrate or one oxynitrate of an element M2 which is chosen from metals or lanthanides; and (iv) between 20% and 88% of water; and carrying out a vitrification heat treatment on the part impregnated with the impregnation composition so as to obtain a glass for protection against oxidation including at least silica, an oxide of M1 and an oxide of M2.

15 Claims, 1 Drawing Sheet

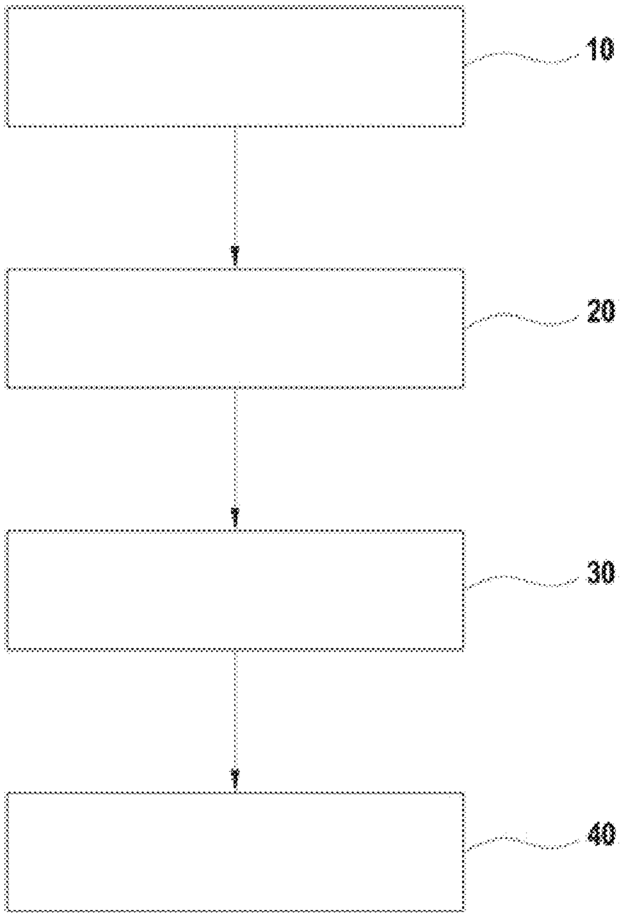
10
20
30
40

METHOD FOR PROTECTION AGAINST OXIDATION OF A COMPOSITE MATERIAL PART COMPRISING CARBON

CROSS-REFERENCE TO RELATED APPLICATIONS

This application is the U.S. National Stage of PCT/FR2023/051155, filed Jul. 25, 2023, which in turn claims priority to French patent application number 2207653 filed Jul. 26, 2022. The content of these applications are incorporated herein by reference in their entireties.

TECHNICAL FIELD

The invention concerns the protection from oxidation of composite material parts containing carbon, i.e., a material comprising a fibrous reinforcement densified by a matrix and in which the fibrous reinforcement and/or the matrix and/or an interphase coating between the fibers of the reinforcement and the matrix are made of carbon. A particular field of application of the invention is the protection against oxidation of parts made of carbon/carbon (C/C) composite material, especially of brake discs made of C/C composite material, and in particular of aircraft brake discs.

PRIOR ART

The materials used for aeronautical braking are C/C composites. These materials were chosen for this application because of their lightness, heat absorption capacity and good tribological properties. Nevertheless, they are liable to be oxidized, especially by oxygen in the air, at operating temperatures which are typically above 450° C. This oxidation can also be catalyzed by de-icing products used in airports.

Several solutions have been developed to prolong the lifetime of a material containing carbon exposed to high temperatures in an oxidizing atmosphere. In particular, it is possible to use a two-layer protection solution comprising an anticatalytic inner layer based on aluminum metaphosphate $Al(PO_3)_3$ and an outer layer preventing the diffusion of oxygen into the material. Such a solution provides satisfactory protection, but it remains desirable to provide new protection solutions which are simpler to implement and which provide at least equivalent protection against thermal oxidation, and possibly catalytic oxidation.

DISCLOSURE OF THE INVENTION

The invention concerns a method for protecting against oxidation a part made of a composite material comprising carbon, comprising:

- impregnating an internal porosity of the part with an impregnation composition comprising, as percentages by weight: (i) between 1% and 60% of colloidal silica, (ii) between 0.5% and 20% of a flux precursor comprising at least one nitrate of an alkali metal M1, (iii) between 0.5% and 20% of a lattice modifying precursor comprising at least one nitrate or oxynitrate of an element M2 which is chosen from metals or lanthanides, and (iv) between 20% and 88% of water; and
- carrying out a vitrification heat treatment on the part impregnated with the impregnation composition to obtain a glass for protection against oxidation comprising at least silica, an oxide of M1 and an oxide of M2.

The invention proposes the use of an impregnation composition of a particular formulation which makes it possible to obtain good protection against oxidation at high temperature while allowing a single protective layer to be used and a single heat treatment to be carried out, thus simplifying the installation of the protection with regard to the two-layer solution described above. In particular, the invention makes it possible to dispense with a prior step of impregnation with an aluminum phosphate so as to form an internal protective layer and the heat treatment for forming the associated anti-oxidation protection, the protective compounds being supplied in a single impregnation step and a single vitrification heat treatment being carried out.

In an exemplary embodiment, the flux precursor comprises at least sodium nitrate, potassium nitrate, or a mixture of these compounds.

The choice of such flux precursors is particularly suitable for the treatment of friction parts.

In an exemplary embodiment, the lattice modifying precursor comprises at least one nitrate of an alkaline earth metal, in particular calcium nitrate and/or magnesium nitrate. The phase diagram of these compounds is known and easily accessible, which makes it possible to optimize the heat treatment temperatures by allowing them to be greatly reduced from approximately 1400° C. to approximately 1000° C. Alternatively or in combination, the lattice modifying precursor comprises at least one nitrate of a transition metal or of a poor metal. The choice of such a compound allows optimizing the heat treatment temperature by allowing it to be greatly reduced from approximately 1400° C. to approximately 1000° C.

In an exemplary embodiment, the impregnation composition further comprises an acid stabilizer present in a weight content comprised between 0.05% and 10%.

The acid stabilizer helps to prevent gelling of the impregnation composition, and thus facilitates the impregnation of the internal porosity of the part.

In particular, the acid stabilizer may be chosen from boric acid $H_3BO_3$, phosphoric acid $H_3PO_4$, nitric acid $HNO_3$ or a mixture of these compounds.

The choice of boric acid $H_3BO_3$ or phosphoric acid $H_3PO_4$ makes it possible to further improve the protection conferred by the glass by allowing the formation of protective phosphorus oxide or boron oxide after the vitrification heat treatment.

In one embodiment, the impregnation composition comprises, in percentages by weight:

- between 10% and 60% of colloidal silica;
- between 0.5% and 20% of flux precursor;
- between 0.5% and 20% of lattice modifying precursor;
- between 0.05% and 10% of acid stabilizer; and
- between 20% and 88% of water.

According to this example, the impregnation composition may be free of metal phosphate, in particular aluminum phosphate.

According to one variant, the impregnation composition comprises in percentages by weight:

- between 1% and 10% of colloidal silica;
- between 20% and 35% of aluminum phosphate;
- between 1% and 7% of flux precursor;
- between 1% and 5% of lattice modifying precursor;
- and between 50% and 77% of water;
- and, after the heat treatment, the oxidation protection glass and an anti-catalytic aluminophosphate phase are obtained. The anticatalytic aluminophosphate phase may be an $Al(PO_3)_3$ phase.

This case corresponds to impregnation compositions comprising dissolved aluminum phosphate. According to this variant, it is possible to dispense with acid stabilizer because aluminum phosphate is itself acidic and prevents gelling of the impregnation composition. Advantageously, the aluminophosphate phase obtained in addition to the glass in this variant makes it possible to improve the resistance to catalytic oxidation.

In an exemplary embodiment, the part is a friction part, for example, an aircraft brake disc. In particular, the friction part may be made of a carbon/carbon composite material.

BRIEF DESCRIPTION OF THE DRAWINGS

FIG. 1 is a flowchart showing a succession of steps that can be implemented in the context of an example of a method according to the invention.

DESCRIPTION OF THE EMBODIMENTS

In the following description, protection against oxidation of parts made of C/C composite material, more particularly brake disks, such as aircraft brake disks, is envisaged. More generally, the invention is applicable to the protection against oxidation of all parts made of composite material containing carbon.

An example of a method according to the invention will first be described in connection with the flowchart of FIG. 1.

The component made of composite material comprising carbon may be obtained in a manner known per se, for example by densifying a fibrous reinforcement by a carbon matrix phase. This densification can be carried out by liquid means by impregnation and pyrolysis of a polymer precursor or by gas means by chemical vapor infiltration. The part obtained has a surface porosity and an internal porosity in communication with the surface porosity and located below the surface of the part.

A first step consists of impregnating the accessible porosity of the composite material with a wetting agent (step 10). This step is known per se. For this purpose, it is typically possible to use an aqueous solution of a wetting agent such as, for example, the product sold by the German company Sasol GmbH under the name "Marlophen NP9". The presence of the wetting agent facilitates penetration of the impregnation composition into the accessible porosity of the composite material.

After impregnation with the wetting agent and drying (step 20), the impregnation composition is applied to the outer surface of the part (step 30). The impregnation composition can be applied with a brush or by spraying (i.e. spraying with a gun). It is typically possible to apply a quantity of impregnation composition per unit area of the treated part comprised between 5 mg/cm$^2$ and 200 mg/cm$^2$.

The impregnation composition comprises a particular combination of compounds which, as indicated above, makes it possible to obtain good protection against oxidation at high temperature while allowing a single protective layer to be used and a single heat treatment to be carried out, thus simplifying the installation of the protection.

The impregnation composition is in the form of a suspension comprising an aqueous phase in which the flux precursor and the lattice modifying precursor are dissolved, and a solid phase suspended in the aqueous phase comprising colloidal silica.

The colloidal silica particles may have an average size of less than or equal to 1000 nm, for example less than or equal to 100 nm. The use of such fine particles facilitates impregnation within the internal porosity of the composite material part. In this way, the protective glass is formed, after the vitrification heat treatment, on the outer surface of the composite material but also inside the material to be protected, under this outer surface, which makes it possible to protect it from the external aggressions encountered during operation, thus improving the protection.

Unless otherwise stated, "mean size" refers to the dimension given by the statistical particle size distribution at half of the population, called D50.

The flux is obtained from the flux precursor during the heat treatment and makes it possible to reduce the melting temperature of the glass, which allows it to soften, during the formation heat treatment, so as to form the glass inside the part at temperatures compatible with an industrial application. According to one example, the flux precursor is chosen from: lithium nitrate $LiNO_3$, sodium nitrate $NaNO_3$, potassium nitrate $KNO_3$, rubidium nitrate $RbNO_3$, cesium nitrate $CsNO_3$, and mixtures of these compounds. In the case of a mixture, the sum of the weight contents of the compounds present is within the range of contents indicated above for the flux precursor. In particular, the flux precursor may be chosen from: sodium nitrate, potassium nitrate, and mixtures of these compounds.

The flux precursor nitrate(s) may be used in hydrated or non-hydrated form.

The lattice modifying precursor is transformed during heat treatment into a lattice modifier, which is a compound that makes it possible to adjust the glass properties, such as hydrolysis resistance, resistance to acid or base attack, melting temperature or viscosity. According to one example, the lattice modifying precursor is chosen from: magnesium nitrate $Mg(NO_3)_2$, calcium nitrate $Ca(NO_3)_2$, strontium nitrate $Sr(NO_3)_2$, barium nitrate $Ba(NO_3)_2$, vanadium oxynitrate $VO(NO_3)_3$, manganese nitrate $Mn(NO_3)_2$, iron nitrate $Fe(NO_3)_3$, cobalt nitrate $Co(NO_3)_2$, copper nitrate $Cu(NO_3)_2$, zirconium nitrate $Zr(NO_3)_4$, zinc nitrate $Zn(NO_3)_2$, cadmium nitrate $Cd(NO_3)_2$, lead nitrate $Pb(NO_3)_2$, lanthanum nitrate $La(NO_3)_3$, cerium nitrate $Ce(NO_3)_3$, and mixtures of these compounds. As for the flux precursor, in the case of a mixture, the sum of the weight contents of the compounds present is within the range of contents indicated above for the lattice modifying precursor. In particular, the lattice modifying precursor may be chosen from: magnesium nitrate, calcium nitrate, and mixtures of these compounds. The use of these compounds is advantageous because they are easy to procure. According to one variant, the lattice modifying precursor may be a nitrate of a poor metal, such as zinc nitrate.

The lattice modifying precursor nitrate(s) may be used in hydrated or non-hydrated form.

In general, the following combinations can be used in the impregnation composition:

- the flux precursor is sodium nitrate and the lattice modifying precursor is calcium nitrate;
- the flux precursor is sodium nitrate and the lattice modifying precursor is zinc nitrate;
- the flux precursor is a mixture of sodium nitrate and potassium nitrate and the lattice modifying precursor is calcium nitrate; or
- the flux precursor is sodium nitrate and the lattice modifying precursor is a mixture of calcium nitrate and magnesium nitrate.

The impregnation composition may comprise other compounds such as an acid stabilizer which may be chosen from boric acid $H_3BO_3$, phosphoric acid $H_3PO_4$, nitric acid $HNO_3$, or a mixture of these compounds.

The impregnation composition can be free of sodium silicate $(Na_2O)_xSiO_2$ with x strictly positive. The impregnation composition provides colloidal silica and alkali metal M1 separately, which makes it possible to modulate the M1/Si ratio more finely and thus improve the effectiveness of the oxidation protection glass compared to the use of a sodium silicate solution. The fact of dispensing with sodium silicate also contributes to improving the stability over time of the impregnation composition (less risk of gelling). In general, the impregnation composition is essentially composed of colloidal silica, the flux precursor, the lattice modifying precursor and water, optionally with the presence of aluminum phosphate and/or acid stabilizer, each of the constituents being present in the contents indicated above.

The impregnation composition is obtained by mixing the different constituents; it should be noted that in the case where the impregnation composition is free of metal phosphate, it may be preferable to add the acid stabilizer to the colloidal silica before adding the flux precursor and the lattice modifying precursor, so as to obtain a pH lower than the isoelectric point of the silica to have no reaction between the silica and the other cations.

As an example of an impregnation composition which can be used in the context of the present invention, mention may be made of the following formulation in which the percentages are by weight: 4% $SiO_2$, 2% $Ca(NO_3)_2$, 24% aluminum phosphate $Al(H_2PO_4)_3$ without water, 67% $H_2O$ and 3% $NaNO_3$.

The impregnation composition applied impregnates the internal porosity of the part and may be present inside the part to a depth greater than or equal to 1 mm, for example greater than or equal to 2 mm, for example comprised between 2 mm and 10 mm. The depth is measured with regard to the external surface of the part.

The vitrification heat treatment is then carried out on the part impregnated with the impregnation composition (step 40). The vitrification heat treatment is carried out by raising the temperature to a temperature comprised between 700° C. and 1200° C. in order to obtain the glass for protection against oxidation. This temperature may be imposed for one or more hours, for example for a period ranging from 10 hours to 15 hours. The vitrification heat treatment can be carried out under a neutral atmosphere, for example under nitrogen ($N_2$). As a result of this heat treatment, the oxidation protection glass is present in the pores inside the part. The oxidation protection glass may be present inside the part to a depth greater than or equal to 1 mm, for example greater than or equal to 2 mm, measured with regard to the external surface of the part. This depth may be comprised between 2 mm and 10 mm.

According to one example, the oxidation protection glass can have the following composition, in molar percentages, $SiO_2$ between 68% and 73%, $Na_2O$ between 15% and 23% and CaO between 5% and 11%. Other examples of glass compositions are listed below (molar percentages):

67% $SiO_2$-22% $Na_2O$-11% ZnO;

70% $SiO_2$-15% $Na_2O$-5% $K_2O$-10% CaO;

70% $SiO_2$-20% $Na_2O$-5% CaO-5% MgO.

The expression "comprised between . . . and . . . " should be understood to include the bounds.

The invention claimed is:

1. A method for protection against oxidation of a composite material part comprising carbon, comprising:

impregnating an internal porosity of the part with an impregnation composition, the part comprising a fibrous reinforcement densified by a matrix, and the impregnation composition comprising, as percentages by weight: (i) between 1% and 60% of colloidal silica, (ii) between 0.5% and 20% of a flux precursor comprising at least one alkali metal nitrate M1, (iii) between 0.5% and 20% of a lattice modifying precursor comprising at least one nitrate of an element M2 which is chosen from alkaline earth metals, transition metals, poor metals or lanthanides or an oxynitrate of an element M2 which is chosen from metals or lanthanides, (iv) between 20% and 88% of water, and (v) an acid stabilizer present in a weight content comprised between 0.05% and 10%, said acid stabilizer preventing gelling of the impregnation composition, the obtaining of the impregnation composition comprising adding the acid stabilizer to the colloidal silica before adding the flux precursor and the lattice modifying precursor, and performing a vitrification heat treatment on the part impregnated with the impregnation composition to obtain a glass for protection against oxidation comprising at least silica, an oxide of M1 and an oxide of M2.

2. The method according to claim 1, wherein the flux precursor comprises at least sodium nitrate, potassium nitrate, or a mixture of these compounds.

3. The method according to claim 1, wherein the lattice modifying precursor comprises at least one nitrate of an alkaline earth metal.

4. The method according to claim 3, wherein the lattice modifying precursor comprises at least one calcium nitrate and/or magnesium nitrate.

5. The method according to claim 1, wherein the lattice modifying precursor comprises at least one nitrate of a transition metal or of a poor metal.

6. The method according to claim 1, wherein the acid stabilizer is chosen from boric acid $H_3BO_3$, phosphoric acid $H_3PO_4$, nitric acid $HNO_3$ or a mixture of these compounds.

7. The method according to claim 1, wherein the impregnation composition comprises in weight percent:

between 10% and 60% of colloidal silica;

between 0.5% and 20% of flux precursor;

between 0.5% and 20% of lattice modifying precursor;

between 0.05% and 10% of acid stabilizer; and between 20% and 88% of water.

8. The protection method according to claim 1, wherein the part is a friction part.

9. The method according to claim 1, wherein the impregnation composition impregnates the internal porosity of the part and is present inside the part to a depth less than or equal to 10 mm.

10. The method according to claim 1, wherein the oxidation protection glass has the following composition, in molar percentages, $SiO_2$ between 68% and 73%, $Na_2O$ between 15% and 23% and CaO between 5% and 11%.

11. The method according to claim 1, wherein the oxidation protection glass has the following composition in molar percentages; 67% $SiO_2$, 22% $Na_2O$ and 11% ZnO.

12. The method according to claim 1, wherein the oxidation protection glass has the following composition in molar percentages: 70% $SiO_2$, 15% $Na_2O$, 5% $K_2O$ and 10% CaO.

13. The method according to claim 1, wherein the oxidation protection glass has the following composition in molar percentages: 70% $SiO_2$, 20% $Na_2O$, 5% CaO and 5% MgO.

14. A method for protection against oxidation of a composite material part comprising carbon, comprising:

impregnating an internal porosity of the part with an impregnation composition, the part comprising a fibrous reinforcement densified by a matrix, and the impregnation composition comprising, as percentages by weight:

(i) between 1% and 10% of colloidal silica, (ii) between 1% and 7% of a flux precursor comprising at least one alkali metal nitrate M1, (iii) between 1% and 7% of a lattice modifying precursor comprising at least one nitrate of an element M2 which is chosen from alkaline earth metals, transition metals, poor metals or lanthanides or an oxynitrate of an element M2 which is chosen from metals or lanthanides, (iv) between 50% and 67% of water, and (v) between 24% and 35% of aluminum phosphate which prevents gelling of the impregnation composition, and performing a vitrification heat treatment on the part impregnated with the impregnation composition to obtain a glass for protection against oxidation comprising at least silica, an oxide of M1 and an oxide of M2, and wherein, after the heat treatment, the oxidation protection glass and an anti-catalytic aluminophosphate phase is obtained.

15. The method according to claim 14, wherein the impregnation composition comprises, as percentages by weight, 4% $SiO_2$, 2% $Ca(NO_3)_2$, 24% aluminum phosphate, $Al(H_2PO_4)_3$ without water, 67% $H_2O$ and 3% $NaNO_3$.

* * * * *